United States Patent
Ingrassia, Jr. et al.

(10) Patent No.: US 12,488,664 B2
(45) Date of Patent: *Dec. 2, 2025

(54) DEVICES AND METHODS FOR LOCATING ACCESSORIES OF AN ELECTRONIC DEVICE

(71) Applicant: Apple Inc., Cupertino, CA (US)

(72) Inventors: Michael Ignazio Ingrassia, Jr., San Jose, CA (US); Nathaniel P. Hramits, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/661,365

(22) Filed: May 10, 2024

(65) Prior Publication Data
US 2024/0296724 A1 Sep. 5, 2024

Related U.S. Application Data

(63) Continuation of application No. 17/669,279, filed on Feb. 10, 2022, now Pat. No. 12,106,641, which is a (Continued)

(51) Int. Cl.
*G08B 13/14* (2006.01)
*G08B 21/24* (2006.01)
*G08B 21/02* (2006.01)

(52) U.S. Cl.
CPC ......... *G08B 13/1427* (2013.01); *G08B 21/24* (2013.01); *G08B 21/0247* (2013.01); *G08B 21/0277* (2013.01)

(58) Field of Classification Search
CPC ............... G08B 13/1427; G08B 21/24; G08B 21/0277; G01S 19/34; H04W 52/0229; H04W 52/0241
See application file for complete search history.

(56) References Cited

U.S. PATENT DOCUMENTS 4,918,425 A 4/1990 Greenberg et al.
5,910,776 A 6/1999 Black
(Continued)

FOREIGN PATENT DOCUMENTS

CN 101682508 3/2010
CN 102325324 A 1/2012
(Continued)

OTHER PUBLICATIONS

PCT/US2019/048899, "Notification of Transmittal of the International Search Report and the Written Opinion of the International Searching Authority, or The Declaration" mailed Dec. 2, 2019, 5 pgs.

(Continued)

*Primary Examiner* — Vernal U Brown
(74) *Attorney, Agent, or Firm* — Kilpatrick Townsend & Stockton LLP

(57) ABSTRACT

Devices and methods for locating accessories of an electronic device are provided. In one example, a method may include detecting parameters associated with disconnecting an accessory from the electronic device. The electronic device, or an associated device, may store the detected parameters so that the detected parameters are accessible if the accessory becomes lost. The electronic device may receive a request from a user of the electronic device for assistance in locating the accessory. In response to the request for assistance in locating the accessory, the electronic device may provide the stored parameters to the user of the electronic device to aid them in searching for their lost accessory.

24 Claims, 9 Drawing Sheets

Related U.S. Application Data continuation of application No. 16/563,539, filed on Sep. 6, 2019, now Pat. No. 11,282,351, which is a continuation of application No. 15/722,830, filed on Oct. 2, 2017, now Pat. No. 10,410,485, which is a continuation of application No. 13/659,217, filed on Oct. 24, 2012, now Pat. No. 9,779,596.

(56) References Cited

U.S. PATENT DOCUMENTS

| | | |
|---|---|---|
| 6,292,660 B1 | 9/2001 | Hartless et al. |
| 6,345,098 B1 | 2/2002 | Matyas, Jr. et al. |
| 6,369,706 B1 | 4/2002 | Anderson et al. |
| 6,754,349 B1 | 6/2004 | Arthan |
| 6,993,350 B2 | 1/2006 | Katoh |
| 7,039,427 B2 | 5/2006 | Tachikawa |
| 7,059,182 B1 | 6/2006 | Ragner |
| 7,224,987 B1 | 5/2007 | Bhela et al. |
| 7,274,761 B2 | 9/2007 | Muller et al. |
| 7,342,497 B2 | 3/2008 | Chung et al. |
| 7,376,393 B2 | 5/2008 | Ono et al. |
| 7,388,491 B2 | 6/2008 | Chand et al. |
| 7,519,377 B2 | 4/2009 | Tsukamoto |
| 7,558,529 B2 | 7/2009 | Seshadri et al. |
| 7,657,248 B2 | 2/2010 | Hodoshima |
| 8,213,389 B2 | 7/2012 | Bush et al. |
| 8,224,355 B2 | 7/2012 | Beydler et al. |
| 8,351,937 B2 | 1/2013 | Lee |
| 8,457,617 B2 | 6/2013 | Sweeney et al. |
| 8,499,337 B1 | 7/2013 | Kenny |
| 8,538,401 B2 | 9/2013 | Kim et al. |
| 8,583,915 B1 | 11/2013 | Huang |
| 8,873,758 B2 | 10/2014 | Bradley |
| 8,971,924 B2 | 3/2015 | Pai et al. |
| 9,009,794 B2 | 4/2015 | Dykeman et al. |
| 9,077,521 B2 | 7/2015 | Machani |
| 9,104,896 B2 | 8/2015 | Pai et al. |
| 9,277,353 B2 | 3/2016 | Merriam |
| 9,277,386 B1 | 3/2016 | Masiero et al. |
| 9,316,717 B2 | 4/2016 | Gicklhorn et al. |
| 9,323,916 B1 | 4/2016 | Wu et al. |
| 9,357,348 B2 | 5/2016 | Evans et al. |
| 9,420,423 B1 | 8/2016 | Mendelson |
| 9,426,749 B2 | 8/2016 | Cordeiro et al. |
| 9,432,802 B2 | 8/2016 | Matsushita et al. |
| 9,439,056 B2 | 9/2016 | Chukka et al. |
| 9,443,366 B2 | 9/2016 | Rayner |
| 9,456,298 B2 | 9/2016 | Lee et al. |
| 9,462,109 B1 | 10/2016 | Frazier Fields et al. |
| 9,516,620 B1 | 12/2016 | Upp et al. |
| 9,520,045 B2 | 12/2016 | Hawkins |
| 9,544,075 B2 | 1/2017 | Altman et al. |
| 9,557,185 B2 | 1/2017 | Kimes |
| 9,565,255 B2 | 2/2017 | Kapoor et al. |
| 9,641,622 B2 | 5/2017 | Kapoor et al. |
| 9,706,032 B2 | 7/2017 | Pai et al. |
| 9,762,316 B2 | 9/2017 | Kukuiski et al. |
| 9,769,601 B2 | 9/2017 | Zelinka |
| 9,779,596 B2 | 10/2017 | Ingrassia et al. |
| 9,781,106 B1 | 10/2017 | Vitus et al. |
| 9,801,059 B2 | 10/2017 | Ziv et al. |
| 9,820,093 B2 | 11/2017 | Mayor et al. |
| 9,848,075 B1 | 12/2017 | Ahmad et al. |
| 9,860,932 B2 | 1/2018 | Kapoor et al. |
| 9,922,531 B1 | 3/2018 | Doxey et al. |
| 9,961,507 B1 | 5/2018 | Mendelson |
| 10,015,836 B2 | 7/2018 | Kapoor et al. |
| 10,022,066 B2 | 7/2018 | Tomiha |
| 10,022,086 B1 | 7/2018 | Kahn et al. |
| 10,042,595 B2 | 8/2018 | Behzadi et al. |
| 10,110,642 B2 | 10/2018 | Numakami |
| 10,366,692 B1 | 7/2019 | Adams et al. |
| 10,368,378 B2 | 7/2019 | Foster et al. |
| 10,410,485 B2 | 9/2019 | Ingrassia et al. |
| 10,448,211 B1 | 10/2019 | Shen et al. |
| 10,506,517 B2 | 12/2019 | Dai Javad et al. |
| 10,600,310 B2 | 3/2020 | Hawkins |
| 10,667,313 B2 | 5/2020 | Maguire et al. |
| 10,701,203 B2 | 6/2020 | Fiorini et al. |
| 10,841,736 B1 | 11/2020 | De La Broise |
| 10,855,483 B1 | 12/2020 | Ramesh et al. |
| 10,862,684 B2 | 12/2020 | Hong et al. |
| 10,956,975 B1 | 3/2021 | Abdul Gaffar et al. |
| 10,970,989 B1 | 4/2021 | Quibelan et al. |
| 10,992,755 B1 | 4/2021 | Tran |
| 11,088,830 B2 | 8/2021 | Gu et al. |
| 11,107,088 B2 | 8/2021 | Radocchia et al. |
| 11,202,168 B2 | 12/2021 | Evans et al. |
| 11,265,716 B2 | 3/2022 | Klinkner et al. |
| 11,282,351 B2 | 3/2022 | Ingrassia, Jr. et al. |
| 11,288,562 B2 | 3/2022 | Purba |
| 11,310,652 B2 | 4/2022 | Norp et al. |
| 11,356,799 B2 | 6/2022 | Haney |
| 11,595,784 B2 | 2/2023 | Mohalik |
| 11,606,669 B2 | 3/2023 | Lopatin et al. |
| 11,622,237 B2 | 4/2023 | Diem |
| 11,641,563 B2 | 5/2023 | Lopatin et al. |
| 11,716,603 B2 | 8/2023 | Lee et al. |
| 11,863,671 B1 | 1/2024 | Sierra et al. |
| 11,889,302 B2 | 1/2024 | Victa et al. |
| 2002/0144215 A1 | 10/2002 | Hoskote et al. |
| 2003/0065918 A1 | 4/2003 | Willey |
| 2003/0092437 A1 | 5/2003 | Nowlin et al. |
| 2003/0182584 A1 | 9/2003 | Banes et al. |
| 2004/0162027 A1 | 8/2004 | Chang |
| 2004/0249817 A1 | 12/2004 | Liu et al. |
| 2005/0021767 A1 | 1/2005 | Cai |
| 2005/0154896 A1 | 7/2005 | Widman et al. |
| 2005/0190098 A1 | 9/2005 | Bridgelall et al. |
| 2005/0285739 A1 | 12/2005 | Velhal et al. |
| 2006/0039337 A1 | 2/2006 | Hodoshima |
| 2006/0111835 A1 | 5/2006 | Baker et al. |
| 2007/0139199 A1 | 6/2007 | Hanlon |
| 2007/0249374 A1 | 10/2007 | Hu et al. |
| 2007/0283151 A1 | 12/2007 | Nakano et al. |
| 2007/0283395 A1 | 12/2007 | Wezowski |
| 2008/0004798 A1 | 1/2008 | Troxler et al. |
| 2008/0119953 A1 | 5/2008 | Reed et al. |
| 2008/0120196 A1 | 5/2008 | Reed et al. |
| 2009/0058670 A1 | 3/2009 | Sweeney et al. |
| 2009/0150674 A1 | 6/2009 | Richardson et al. |
| 2009/0315767 A1 | 12/2009 | Scalisi et al. |
| 2009/0323972 A1 | 12/2009 | Kohno et al. |
| 2009/0325599 A1 | 12/2009 | Vuori |
| 2010/0079249 A1 | 4/2010 | Pan |
| 2010/0159833 A1 | 6/2010 | Lewis et al. |
| 2010/0184378 A1 | 7/2010 | Wakefield |
| 2010/0245054 A1 | 9/2010 | Kim |
| 2010/0289620 A1 | 11/2010 | Aminger et al. |
| 2011/0124326 A1 | 5/2011 | Kudo |
| 2012/0054493 A1 | 3/2012 | Bradley |
| 2012/0083209 A1 | 4/2012 | Giles et al. |
| 2012/0100868 A1 | 4/2012 | Kim et al. |
| 2012/0275361 A1 | 11/2012 | Berenberg et al. |
| 2012/0310391 A1 | 12/2012 | Sanders |
| 2012/0328061 A1 | 12/2012 | Chow |
| 2013/0023238 A1 | 1/2013 | Kaplan et al. |
| 2013/0034004 A1 | 2/2013 | Mannemala et al. |
| 2013/0104035 A1 | 4/2013 | Wagner et al. |
| 2013/0111555 A1 | 5/2013 | Leneel |
| 2013/0171986 A1 | 7/2013 | Shimizu |
| 2013/0271902 A1 | 10/2013 | Lai et al. |
| 2013/0275873 A1 | 10/2013 | Shaw et al. |
| 2013/0290191 A1 | 10/2013 | Dischamp et al. |
| 2013/0290522 A1 | 10/2013 | Behm, Jr. |
| 2013/0343542 A1 | 12/2013 | Rosati et al. |
| 2014/0111307 A1 | 4/2014 | Ingrassia et al. |
| 2014/0222685 A1 | 8/2014 | Middleton et al. |
| 2014/0379584 A1 | 12/2014 | Ward |
| 2015/0019124 A1 | 1/2015 | Bandyopadhyay et al. |
| 2015/0072618 A1 | 3/2015 | Granbery |
| 2015/0189596 A1 | 7/2015 | Stephens |
| 2015/0277852 A1 | 10/2015 | Burgis |
| 2015/0289207 A1 | 10/2015 | Kubo et al. |

(56) References Cited

U.S. PATENT DOCUMENTS

| | | |
|---|---|---|
| 2015/0334569 A1 | 11/2015 | Rangarajan et al. |
| 2015/0350140 A1 | 12/2015 | Garcia et al. |
| 2015/0350820 A1 | 12/2015 | Son et al. |
| 2015/0356030 A1 | 12/2015 | Zahand et al. |
| 2015/0382140 A1 | 12/2015 | Cho et al. |
| 2016/0006577 A1 | 1/2016 | Logan |
| 2016/0017402 A1 | 1/2016 | Roth et al. |
| 2016/0037439 A1 | 2/2016 | Shamis et al. |
| 2016/0057572 A1 | 2/2016 | Bojorquez Alfaro et al. |
| 2016/0057625 A1 | 2/2016 | Andrada et al. |
| 2016/0069991 A1 | 3/2016 | Das et al. |
| 2016/0080591 A1 | 3/2016 | Asakura |
| 2016/0087959 A1 | 3/2016 | Park |
| 2016/0088143 A1 | 3/2016 | Cohn et al. |
| 2016/0094947 A1 | 3/2016 | Shen et al. |
| 2016/0131490 A1 | 5/2016 | Kimes |
| 2016/0140335 A1 | 5/2016 | Proulx et al. |
| 2016/0164973 A1 | 6/2016 | Kapoor et al. |
| 2016/0174023 A1 | 6/2016 | Cavallaro et al. |
| 2016/0180392 A1 | 6/2016 | Liu et al. |
| 2016/0189507 A1 | 6/2016 | Rayner |
| 2016/0205556 A1 | 7/2016 | Borghei |
| 2016/0212538 A1 | 7/2016 | Fullam et al. |
| 2016/0234213 A1 | 8/2016 | Kim et al. |
| 2016/0242192 A1 | 8/2016 | Llosa et al. |
| 2016/0248564 A1 | 8/2016 | Qi et al. |
| 2016/0302137 A1 | 10/2016 | Escott et al. |
| 2016/0330095 A1 | 11/2016 | Numakami |
| 2016/0344712 A1 | 11/2016 | Ding et al. |
| 2016/0352518 A1 | 12/2016 | Ford et al. |
| 2016/0357385 A1 | 12/2016 | Dan et al. |
| 2016/0360350 A1 | 12/2016 | Watson et al. |
| 2016/0371507 A1 | 12/2016 | Jakobsson |
| 2017/0006417 A1 | 1/2017 | Canoy et al. |
| 2017/0078408 A1 | 3/2017 | Lepp et al. |
| 2017/0126818 A1 | 5/2017 | Kang |
| 2017/0127340 A1 | 5/2017 | Dooey et al. |
| 2017/0134898 A1 | 5/2017 | Vega et al. |
| 2017/0171181 A1 | 6/2017 | Britt |
| 2017/0228935 A1 | 8/2017 | Foster et al. |
| 2017/0272415 A1 | 9/2017 | Zhao et al. |
| 2017/0330031 A1 | 11/2017 | Wilson et al. |
| 2018/0013815 A1 | 1/2018 | Gold |
| 2018/0025595 A1 | 1/2018 | Ingrassia et al. |
| 2018/0035374 A1 | 2/2018 | Borden et al. |
| 2018/0176748 A1 | 6/2018 | Kim et al. |
| 2018/0183591 A1 | 6/2018 | De Laat et al. |
| 2018/0183596 A1 | 6/2018 | Deshpande et al. |
| 2018/0184286 A1 | 6/2018 | Patterson |
| 2018/0199138 A1 | 7/2018 | Dusan et al. |
| 2018/0219872 A1 | 8/2018 | Sugashima et al. |
| 2018/0227284 A1 | 8/2018 | Sugano et al. |
| 2018/0262907 A1 | 9/2018 | Alanis et al. |
| 2018/0288208 A1 | 10/2018 | Lee et al. |
| 2018/0317266 A1 | 11/2018 | Britt et al. |
| 2018/0343561 A1 | 11/2018 | Patterson |
| 2018/0348718 A1 | 12/2018 | Richardson et al. |
| 2019/0028281 A1 | 1/2019 | Turissini et al. |
| 2019/0028445 A1 | 1/2019 | McLaughlin et al. |
| 2019/0034920 A1 | 1/2019 | Nolan et al. |
| 2019/0037469 A1 | 1/2019 | Krishnan et al. |
| 2019/0058966 A1 | 2/2019 | Puppala et al. |
| 2019/0069243 A1 | 2/2019 | Bean et al. |
| 2019/0116173 A1 | 4/2019 | Robison et al. |
| 2019/0124469 A1 | 4/2019 | Roy et al. |
| 2019/0191301 A1 | 6/2019 | Fang et al. |
| 2019/0213528 A1 | 7/2019 | Gupta et al. |
| 2019/0246253 A1 | 8/2019 | Ryu et al. |
| 2019/0289059 A1 | 9/2019 | Vanahalli et al. |
| 2020/0034835 A1 | 1/2020 | Kim |
| 2020/0074822 A1 | 3/2020 | Ingrassia, Jr. et al. |
| 2020/0107164 A1 | 4/2020 | Lopatin et al. |
| 2020/0145244 A1 | 5/2020 | Hollinger et al. |
| 2020/0177595 A1 | 6/2020 | Rakshit et al. |
| 2020/0187001 A1 | 6/2020 | Ard et al. |
| 2020/0226908 A1 | 7/2020 | Doxey et al. |
| 2020/0242662 A1 | 7/2020 | Middleton et al. |
| 2020/0314233 A1 | 10/2020 | Mohalik et al. |
| 2020/0344549 A1 | 10/2020 | Wegener |
| 2021/0044957 A1 | 2/2021 | Norp et al. |
| 2021/0136846 A1 | 5/2021 | Ponnusamy et al. |
| 2021/0203747 A1 | 7/2021 | Gorsica, IV et al. |
| 2021/0204115 A1 | 7/2021 | Gorsica, IV et al. |
| 2021/0250355 A1 | 8/2021 | Galdo et al. |
| 2021/0256833 A1 | 8/2021 | Daouta et al. |
| 2021/0334851 A1 | 10/2021 | Proctor, Jr. et al. |
| 2021/0400045 A1 | 12/2021 | Kondeti |
| 2022/0021684 A1 | 1/2022 | Mensah et al. |
| 2022/0052847 A1 | 2/2022 | Gonzalez Cervantes et al. |
| 2022/0070667 A1 | 3/2022 | Victa et al. |
| 2022/0078029 A1 | 3/2022 | Galdo et al. |
| 2022/0165139 A1 | 5/2022 | Ingrassia, Jr. et al. |
| 2022/0200789 A1 | 6/2022 | Lalande et al. |
| 2022/0224300 A1 | 7/2022 | Knode |
| 2022/0256633 A1 | 8/2022 | Gu et al. |
| 2022/0327196 A1 | 10/2022 | Trapani |
| 2022/0369022 A1 | 11/2022 | Jorgovanovic et al. |
| 2022/0386076 A1 | 12/2022 | Lopatin et al. |
| 2022/0394431 A1 | 12/2022 | Lopatin et al. |
| 2022/0394660 A1 | 12/2022 | Werner et al. |

FOREIGN PATENT DOCUMENTS

| | | |
|---|---|---|
| CN | 104833945 | 8/2015 |
| CN | 106412816 | 2/2017 |
| CN | 106792501 A | 5/2017 |
| CN | 107328424 | 11/2017 |
| CN | 108223229 A | 6/2018 |
| CN | 108520552 | 9/2018 |
| CN | 109596118 | 4/2019 |
| CN | 111436040 | 7/2020 |
| CN | 112068512 | 12/2020 |
| CN | 114071357 | 2/2022 |
| EP | 1296155 | 3/2003 |
| EP | 1296155 B1 | 3/2003 |
| EP | 2020784 | 2/2009 |
| GB | 2472192 A | 2/2011 |
| JP | H11262065 | 9/1999 |
| JP | 2007150904 | 6/2007 |
| JP | 2018191522 | 12/2018 |
| JP | 2021025798 | 2/2021 |
| KR | 20140044916 | 4/2014 |
| KR | 20170013833 | 2/2017 |
| KR | 20180086118 | 7/2018 |
| KR | 2019-0141998 A | 12/2019 |
| WO | 2010126846 | 11/2010 |
| WO | 2012030733 | 3/2012 |
| WO | 2013036488 | 3/2013 |
| WO | 2013163334 | 10/2013 |
| WO | 2014005004 | 3/2014 |
| WO | 2014042507 A1 | 3/2014 |
| WO | 2016032610 | 3/2016 |
| WO | 2016036453 A1 | 3/2016 |
| WO | 2017107077 | 6/2017 |
| WO | 2018001518 A1 | 1/2018 |
| WO | 2018118026 A1 | 6/2018 |
| WO | 2018135919 | 7/2018 |
| WO | 2018156555 | 8/2018 |
| WO | 2018160863 A1 | 9/2018 |
| WO | 2019232420 A2 | 12/2019 |
| WO | 2020214701 A1 | 10/2020 |
| WO | 2020214708 A1 | 10/2020 |
| WO | 2020214709 A1 | 10/2020 |
| WO | 2020214711 A1 | 10/2020 |
| WO | 2022046527 | 3/2022 |
| WO | 2022256438 | 12/2022 |

OTHER PUBLICATIONS

A. Korolova et al., "Cross-App Tracking Via Nearby Bluetooth Low Energy Devices", A presentation proposal for PrivacyCon 2017, Published Mar. 13, 2018, 12 pgs.

(56) References Cited

OTHER PUBLICATIONS

PCT/US2020/028318, "PCT Notification of Transmittal of the International Search Report and the Written Opinion of the International Searching Authority, or the Declaration", Mailed Jul. 8, 2020, 16 pages.
PCT/US2020/028326, "PCT Notification of Transmittal of the International Search Report and the Written Opinion of the International Searching Authority, or the Declaration", Mailed Jul. 3, 2020, 12 pages.
PCT/US2020/028327, "PCT Notification of Transmittal of the International Search Report and the Written Opinion of the International Searching Authority, or the Declaration", Mailed Sep. 14, 2020, 17 pages.
PCT/US2020/028329, "PCT Notification of Transmittal of the International Search Report and the Written Opinion of the International Searching Authority, or the Declaration", Mailed Jul. 15, 2020, 13 pages.
Mannan, Mohammad, et al. "Mercury: Recovering forgotten passwords using personal devices." International Conference on Financial Cryptography and Data Security. Springer, Berlin, Heidelberg, 2011 (Year: 2011).
FOFA, "Find One, Find All Key Finder & Remote Control Locators", received from The Wayback Machine—https://web.archive.org/web/20200715080402/http://www.findonefindall.com:80/index.htm, 3 pages.
Kim et al., "In/Out Status Monitoring in Mobile Asset Tracking with Wireless Sensor Networks", received from www.mdpi.com/journal/sensors, published Mar. 26, 2010, 22 pages.
Fuemmeler et al., "Energy Efficient Multi-Object Tracking in Sensor Networks", received from https://ieeexplore.ieee.org/document/5439914, published Mar. 29, 2010, 9 pages.
Cocchi et al., "Subband Neural Networks Prediction for On-Line Audio Signal Recovery", received from https://ieeexplore.ieee.org/document/1021887, Published Jul. 2002, 10 pages.
PCT/US2022/027681, "PCT Notification of transmittal of the International Search Report and the Written Opinion of the International Searching Authority, or the Declaration", mailed Jul. 28, 2022, 9 pages.
EP22172663.1, "Extended European Search Report" mailed Jan. 25, 2023, 18 pages.
Lopez, Mareo, "The Importance of a Speaker's Resonant Frequency", proaudioland.com, 3 pages, Aug. 2015 (Year: 2015).
Thetileapp.com [online], "Learn How Tile's Tracking Device Helps You Find Your Lost Things," Dec. 9, 2016, retrieved from URL <https://www.thetileapp.com/how-it-works>, 9 pages.
PCT/US2023/017975, "PCT Notification of Transmittal of the International Search Report and the Written Opinion of the International Searching Authority, or the Declaration", mailed Jun. 29, 2023, 12 pages.
EP23196053.5, "Extended European Search Report", mailed Sep. 26, 2023, 7 pages.

DEVICES AND METHODS FOR LOCATING ACCESSORIES OF AN ELECTRONIC DEVICE

CROSS REFERENCE TO RELATED APPLICATIONS

This application is a Continuation application claiming priority to U.S. patent application Ser. No. 17/669,279, entitled "Devices and Methods for Locating Accessories of an Electronic Device," filed Feb. 10, 2022, which is a Continuation Application of U.S. patent application Ser. No. 16/563,539, entitled "Devices and Methods for Locating Accessories of an Electronic Device," filed Sep. 6, 2019, which is a Continuation Application claiming priority to U.S. patent application Ser. No. 15/722,830, entitled "Devices and Methods for Locating Accessories of an Electronic Device," filed Oct. 2, 2017, which is a Continuation application claiming priority to U.S. patent application Ser. No. 13/659,217, entitled "Devices and Methods for Locating Accessories of an Electronic Device," filed Oct. 24, 2012, each of which are herein incorporated by reference.

BACKGROUND

The present disclosure relates generally to electronic devices and, more particularly, to devices and methods for locating accessories of an electronic device.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Many accessories are currently available for use with electronic devices. For example, such accessories may include headphones (e.g., wired, wireless), adaptor cables (e.g., for connecting the electronic device to a computer), power cables (e.g., for powering the electronic device and/or for charging a battery of the electronic device), keyboards, docking stations, and speakers. Certain accessories may interchangeably be connected to multiple electronic devices, and users routinely move accessories from one device to another. One unfortunate consequence of such interconnectivity and mobility is that individuals that use accessories with different electronic devices may inadvertently misplace their accessories.

To aid an individual in finding some accessories, the accessories may include electronics to transmit signals to another device. Based on characteristics of the transmitted signals, the receiving device may be able to determine if the accessory is within a certain range. However, some accessories have limited abilities, or no ability, to transmit signals to another device. For example, wired headsets, adaptor cables, power cables, keyboards, docking stations, and speakers may have no ability to transmit signals. Moreover, wireless headphones may have limited abilities to transmit signals (e.g., they may be limited to providing signals only when another device is within a limited transmission range of the wireless headphones).

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to devices and methods for locating accessories of an electronic device. By way of example, a method for locating accessories of an electronic device may include detecting parameters associated with disconnecting an accessory from the electronic device. The electronic device, or an associated device, may store the detected parameters so that the detected parameters are accessible if the accessory becomes lost. The electronic device may receive a request from a user of the electronic device for assistance in locating the accessory. In response to the request for assistance in locating the accessory, the electronic device may provide the stored parameters to the user of the electronic device to aid them in searching for their lost accessory.

Various refinements of the features noted above may be made in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone, or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, embodiments of the present disclosure relate to devices and methods for locating accessories of an electronic device. Specifically, the present disclosure relates to methods to aid a user of the electronic device in finding accessories that are not capable of providing feedback to the electronic device (e.g., wired headphones, an adaptor cable, a power cable, a keyboard, a docking station, a speaker). For example, the electronic device may provide information relating to when the accessory was last used to aid the user in finding the accessory. Moreover, the present disclosure also relates to methods to aid a user of the electronic device in finding accessories that have limited capabilities of providing feedback to the electronic device (e.g., Bluetooth or Wi-Fi enabled technology, such as wireless headphones). Furthermore, the present disclosure relates to methods of using multiple electronic devices to find a lost accessory. The present disclosure also relates to methods for detecting free fall of an electronic device and providing a notification to a user before the electronic device becomes lost. Accordingly, embodiments of the present disclosure may facilitate finding accessories and/or inhibiting loss of accessories of an electronic device.

Figure 1:
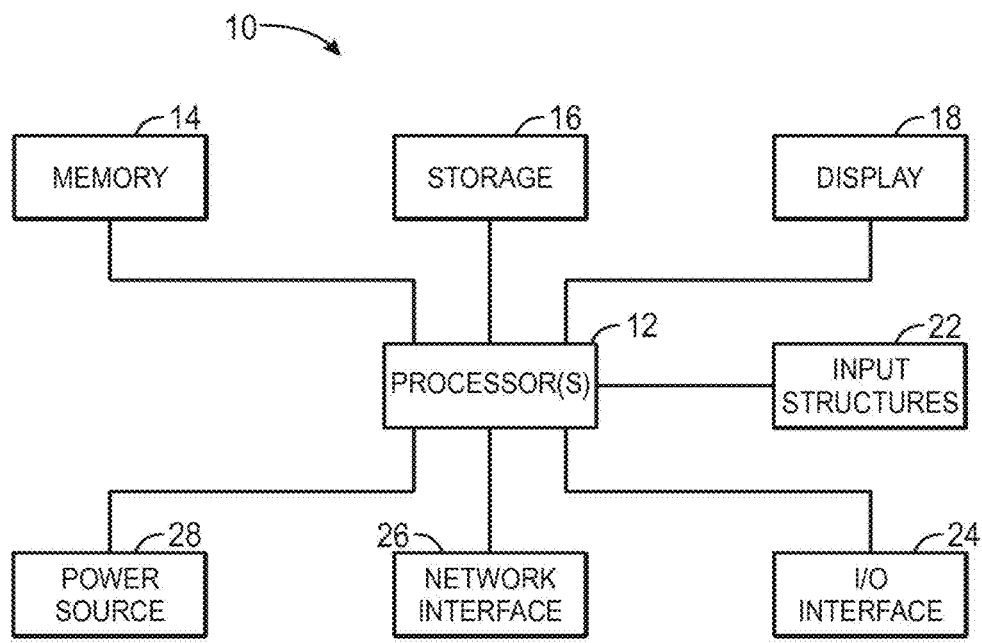
FIG. 1 is a schematic block diagram of an electronic device that may be configured to aid a user in locating accessories of the electronic device, in accordance with an embodiment.
Figure 2:
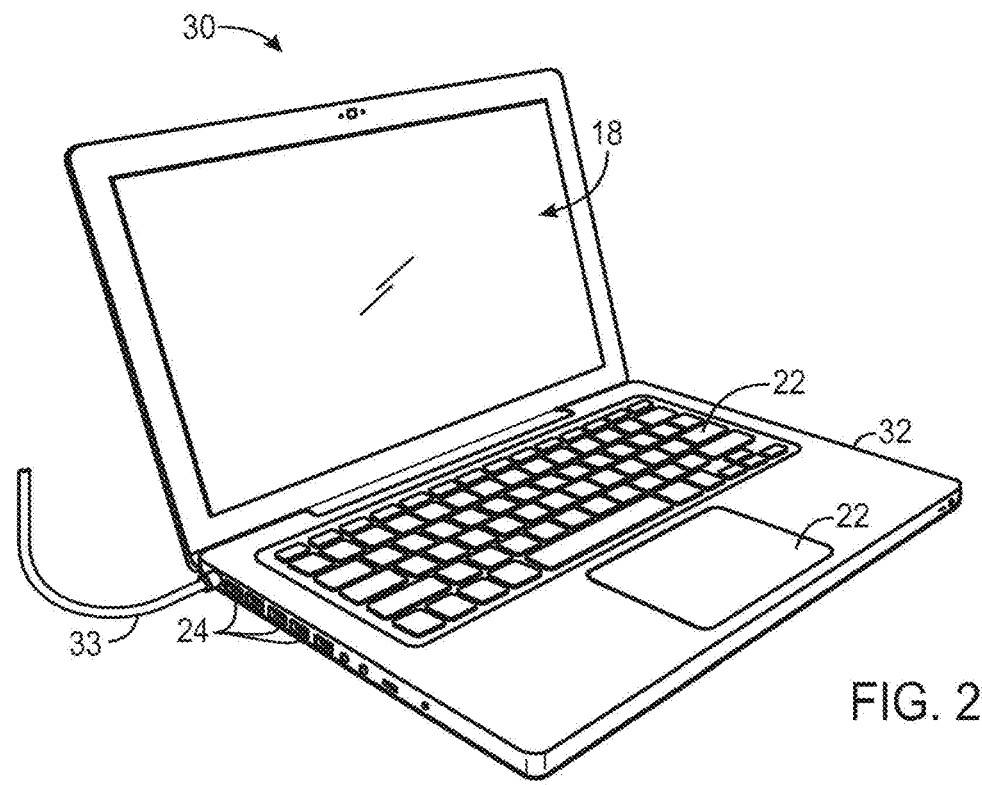
FIG. 2 is a perspective view of a notebook computer representing an embodiment of the electronic device of FIG. 1.
Figure 3:
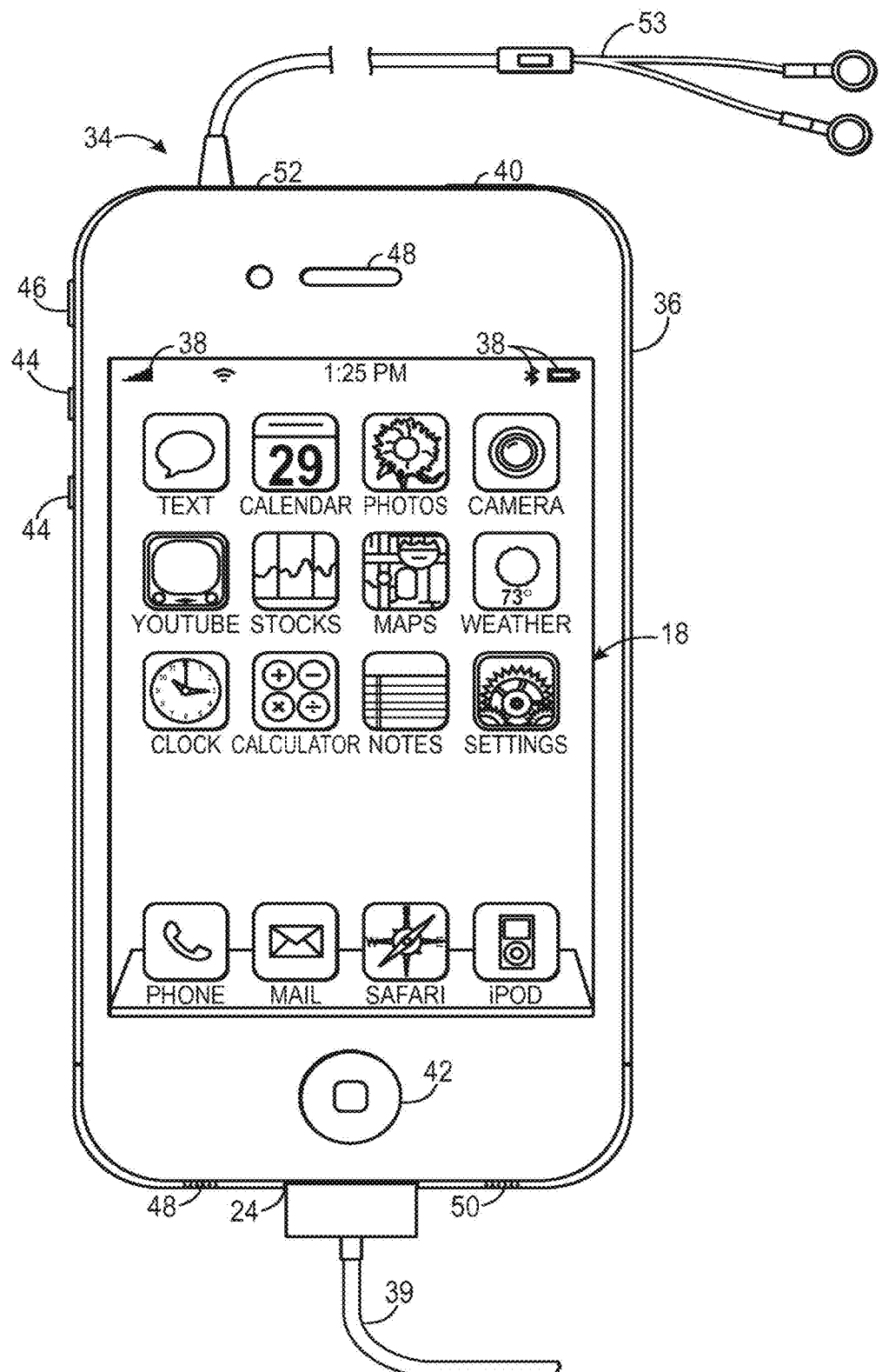
FIG. 3 is a front view of a handheld device representing another embodiment of the electronic device of FIG. 1.
Figure 4:
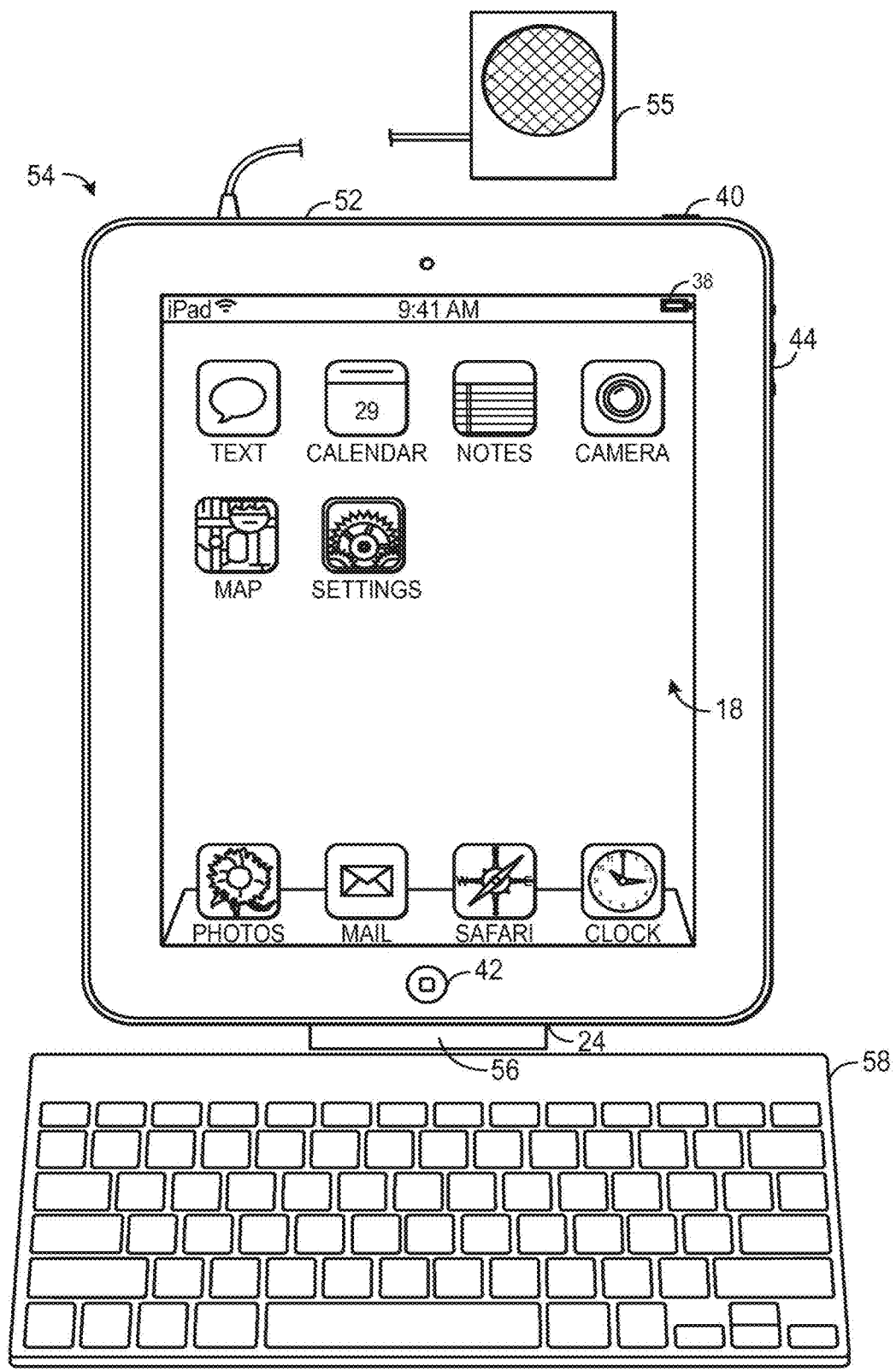
FIG. 4 is a front view of a tablet device representing a further embodiment of the electronic device of FIG. 1.

With the foregoing in mind, a general description of suitable electronic devices that may employ methods for finding accessories and/or inhibiting loss of accessories of the electronic device is described below. In particular, FIG. 1 is a block diagram depicting various components that may be present in an electronic device suitable for executing such methods. FIGS. 2, 3, and 4 illustrate views of a suitable electronic device, which may be, as illustrated, a notebook computer, a handheld electronic device, or a tablet electronic device.

Turning first to FIG. 1, an electronic device 10 according to an embodiment of the present disclosure may include, among other things, one or more processor(s) 12, memory 14, nonvolatile storage 16, a display 18, input structures 22, an input/output (I/O) interface 24, network interfaces 26, and a power source 28. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in the electronic device 10.

By way of example, the electronic device 10 may represent a block diagram of the notebook computer depicted in FIG. 2, the handheld electronic device depicted in FIG. 3, the tablet electronic device depicted in FIG. 4, or similar devices. It should be noted that the processor(s) 12 and/or other data processing circuitry may be generally referred to herein as "data processing circuitry." This data processing circuitry may be embodied wholly or in part as software, firmware, hardware, or any combination thereof. Furthermore, the data processing circuitry may be a single contained processing module or may be incorporated wholly or partially within any of the other elements within the electronic device 10. As presented herein, the data processing circuitry may be configured to execute instructions for performing the methods described below.

In the electronic device 10 of FIG. 1, the processor(s) 12 and/or other data processing circuitry may be operably coupled with the memory 14 and the nonvolatile memory 16 to execute instructions. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions that may be executed by the processor(s) 12.

The display 18 may be a touch-screen liquid crystal display (LCD), for example, which may enable users to interact with a user interface of the electronic device 10. In some embodiments, the electronic display 18 may be a MultiTouch™ display that can detect multiple touches at once.

The input structures 22 of the electronic device 10 may enable a user to interact with the electronic device 10 (e.g., pressing a button to increase or decrease a volume level). The I/O interface 24 may enable the electronic device 10 to interface with various other electronic devices, as may the network interfaces 26. The network interfaces 26 may include, for example, interfaces for a personal area network (PAN), such as a Bluetooth network, for a local area network (LAN), such as an 802.11x Wi-Fi network, and/or for a wide area network (WAN), such as a 3G or 4G cellular network. The power source 28 of the electronic device 10 may be any suitable source of power, such as a rechargeable lithium polymer (Li-poly) battery and/or an alternating current (AC) power converter.

The electronic device 10 may take the form of a computer or other type of electronic device (e.g., television). Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 30, is illustrated in FIG. 2 in accordance with one embodiment of the present disclosure. The depicted computer 30 may include a housing 32, a display 18, input structures 22, and ports of an I/O interface 24 (e.g., for attaching accessories). In one embodiment, the input structures 22 (such as a keyboard and/or touchpad) may be used to interact with the computer 30, such as to start, control, or operate a GUI or applications running on computer 30. For example, a keyboard and/or touchpad may allow a user to navigate a user interface or application interface displayed on the display 18. As illustrated, a power cable 33 may be used to connect the computer 30 to a power source.

Moreover, FIG. 3 depicts a front view of a handheld device 34, which represents one embodiment of the electronic device 10. The handheld device 34 may represent, for example, a portable phone, a media player, a personal data organizer, a handheld game platform, or any combination of such devices. By way of example, the handheld device 34 may be a model of an iPod® or iPhone® available from Apple Inc. of Cupertino, California.

The handheld device 34 may include an enclosure 36 to protect interior components from physical damage and to shield them from electromagnetic interference. The enclosure 36 may surround the display 18, which may display indicator icons 38. The indicator icons 38 may indicate, among other things, a cellular signal strength, Bluetooth connection, and/or battery life. The I/O interfaces 24 may open through the enclosure 36 and may include, for example, a proprietary I/O port from Apple Inc. to connect to external devices (e.g., accessories such as an adaptor cable 39, a power cable, a keyboard, a docking station, etc.).

User input structures 40, 42, 44, and 46, in combination with the display 18, may allow a user to control the handheld device 34. For example, the input structure 40 may activate or deactivate the handheld device 34, the input structure 42 may navigate a user interface to a home screen, a user-configurable application screen, and/or activate a voice-recognition feature of the handheld device 34, the input structures 44 may provide volume control, and the input structure 46 may toggle between vibrate and ring modes. A microphone 48 may obtain a user's voice for various voice-related features, and a speaker 50 may enable audio playback and/or certain phone capabilities. A headphone input 52 may provide a connection to external speakers and/or headphones (e.g., wired headphones 53). The electronic device 10 may also be a tablet device 54, as illustrated in FIG. 4. For example, the electronic device 10 may be a model of an iPad® available from Apple Inc. of Cupertino, California. The tablet device 54 may have external speakers 55 connected to the headphone input 52 for providing audio output. Moreover, the tablet device 54 may communicate with a docking station 56 using the I/O interface 24, such as for charging the tablet device 54. As illustrated, a wireless keyboard 58 may communicate with the tablet device 54 for providing input to the tablet device 54.

Figure 5:
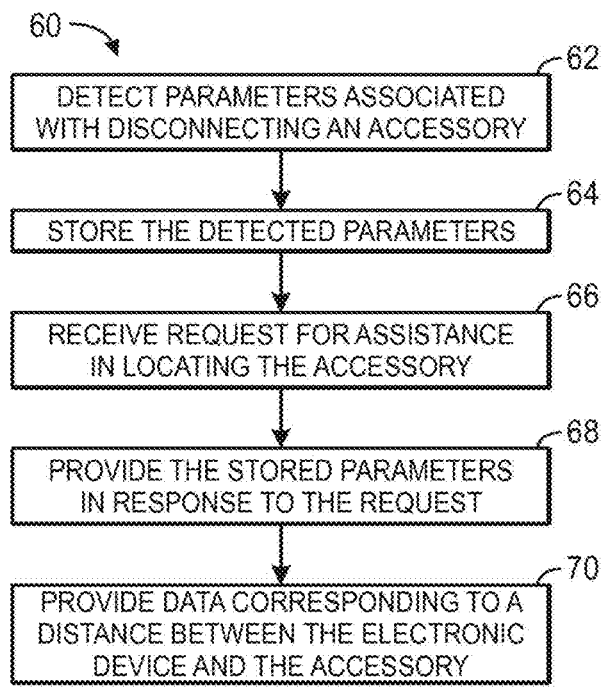
FIG. 5 is a flowchart describing a method for locating accessories of the electronic device of FIG. 1, in accordance with an embodiment.

As discussed above, various wired and wireless accessories may be attached and/or connected to the electronic device 10. For example, accessories may include wired headphones, wireless headphones, a Bluetooth device, a Wi-Fi device, an adaptor cable, a power cable, a keyboard, a docking station, and a speaker. Such accessories may become lost or misplaced (e.g., unable to be found or located by a user of the accessories). Moreover, FIG. 5 is a flowchart describing a method 60 for locating accessories of the electronic device 10 of FIG. 1.

The electronic device 10 may be configured to detect parameters associated with disconnecting an accessory from the electronic device 10 (block 62). The detected parameters may include any suitable information relating to the connection between the accessory and the electronic device 10. For example, the detected parameters may include information that is directly associated with disconnecting the accessory from the electronic device 10 (e.g., a time when the accessory was disconnected from the electronic device 10, a date when the accessory was disconnected from the electronic device 10, a location where the accessory was disconnected from the electronic device 10, a media file being used while the accessory was disconnected from the electronic device 10, a program being used while the accessory was disconnected from the electronic device 10, and so forth).

As another example, the detected parameters may include information that is indirectly associated with disconnecting the accessory from the electronic device 10 (e.g., a time when the accessory was connected to the electronic device 10, a date when the accessory was connected to the electronic device 10, a location where the accessory was connected to the electronic device 10, a media file last used before the accessory was disconnected from the electronic device 10, a program last used before the accessory was disconnected from the electronic device 10, device identification data of the accessory, and so forth). As may be appreciated, the location parameter may be a latitude and a longitude, an address, a name of a business, a predefined location identifier, a GPS labeled pin on a map, a compass showing direction from the electronic device to the accessory, or any other suitable type of information to identify a location. Moreover, the media file parameter may be a song title, an album name, an artist, a movie name, a file name, and so forth, that a user was listening to and/or watching when the accessory (e.g., headset) was disconnected to provide a "memory clue" to help the user remember where the accessory was last used (e.g., misplaced). Further, the device identification data may be data that corresponds to the accessory. For example, the device identification data may be a MAC address, a serial number, a part number, a device name, a device type, or any other suitable identification data (e.g., a unique identifier).

After the parameters are detected by the electronic device 10, the detected parameters may be stored (block 64). In some embodiments, the detected parameters may be stored in the memory 14 and/or storage 16 of the electronic device 10. Moreover, in other embodiments, the detected parameters may be stored remotely from the electronic device 10 (e.g., on another device accessible by a network connection). The electronic device 10 may receive a request for assistance in locating the accessory (block 66). For example, a user of the electronic device 10 may provide input to the electronic device 10 to request assistance in locating the accessory.

In response to the request for assistance, the electronic device 10 may provide the stored parameters to the user (block 68). For example, the electronic device 10 may display the stored parameters on the display 18 of the electronic device 10. In some embodiments, the electronic device 10 may show a location of an accessory on a map. In certain embodiments, the electronic device 10 may provide data corresponding to a distance between the electronic device 10 and the accessory (block 70). For example, in embodiments where the accessory is a Bluetooth or Wi-Fi device, the electronic device 10 may detect data that corresponds to a distance between the electronic device 10 and the accessory, and may provide the data to the user of the electronic device 10.

Figure 6:
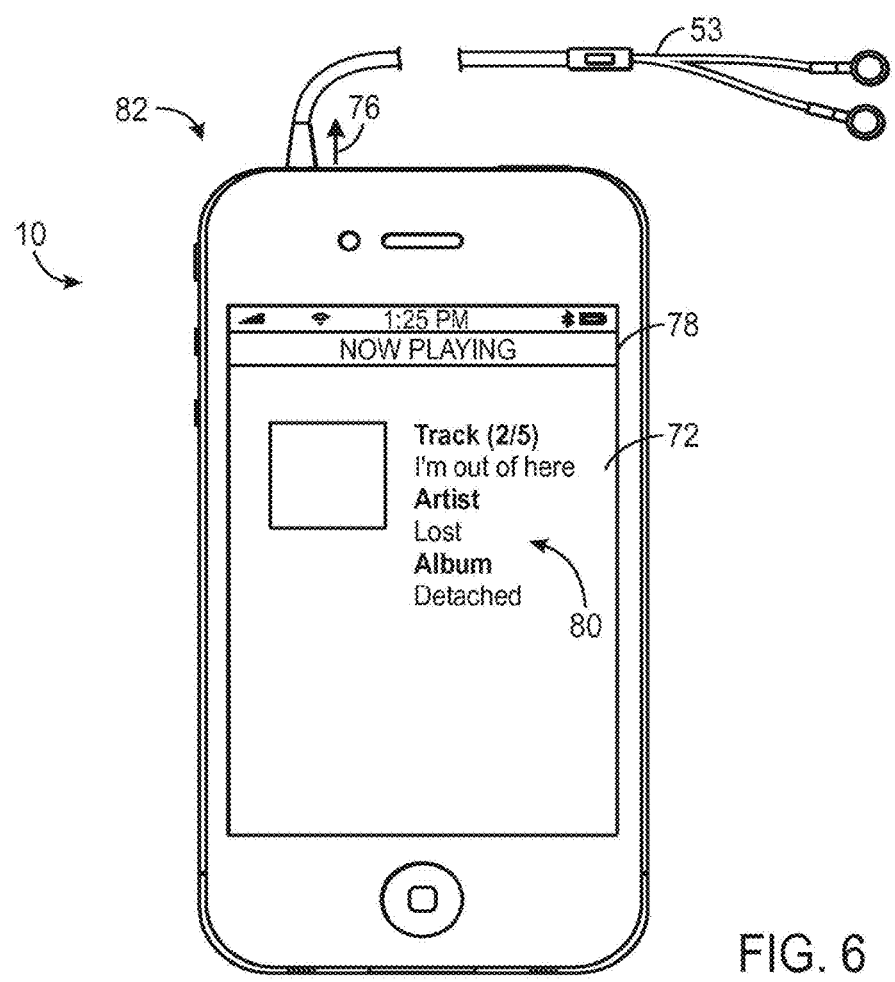
FIG. 6 illustrates a screen of the electronic device of FIG. 1 that may be displayed when an accessory is disconnected from the electronic device, in accordance with an embodiment.
Figure 7:
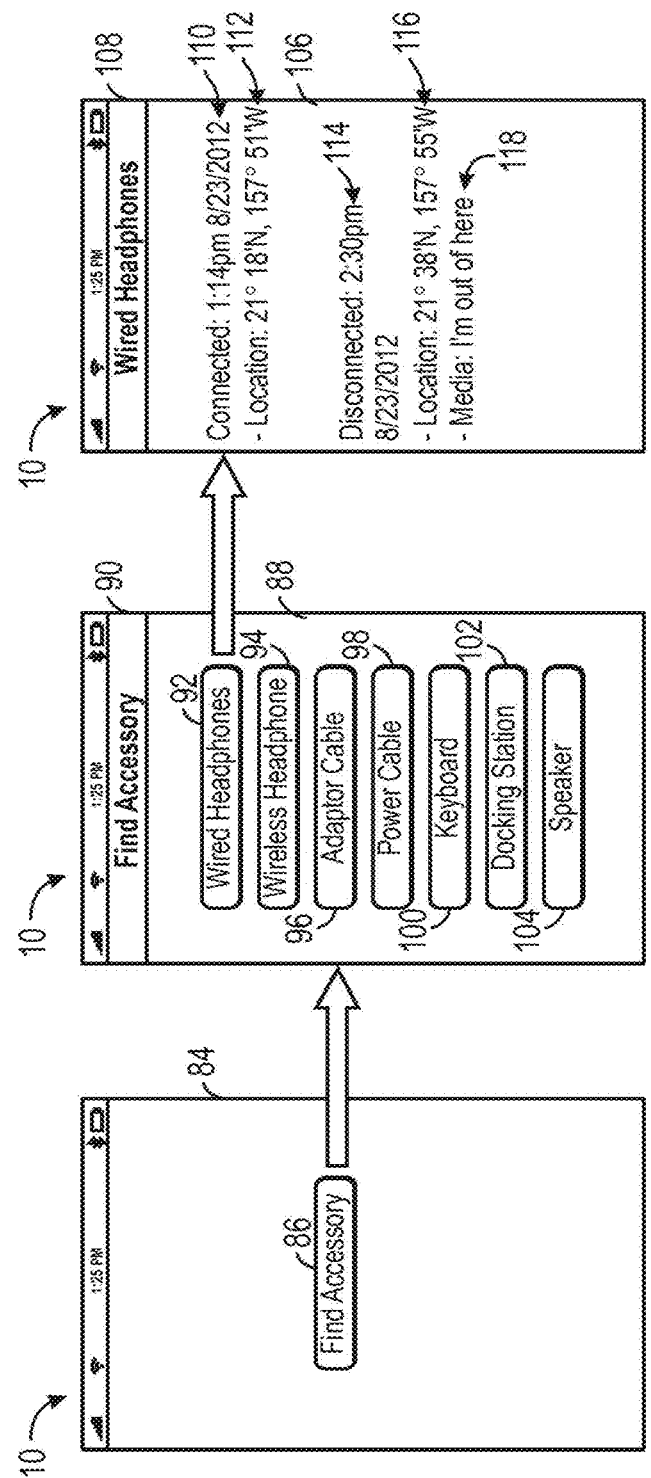
FIG. 7 illustrates screens of the electronic device of FIG. 1 that may aid a user of the electronic device in finding a lost accessory, in accordance with an embodiment.
Figure 8:
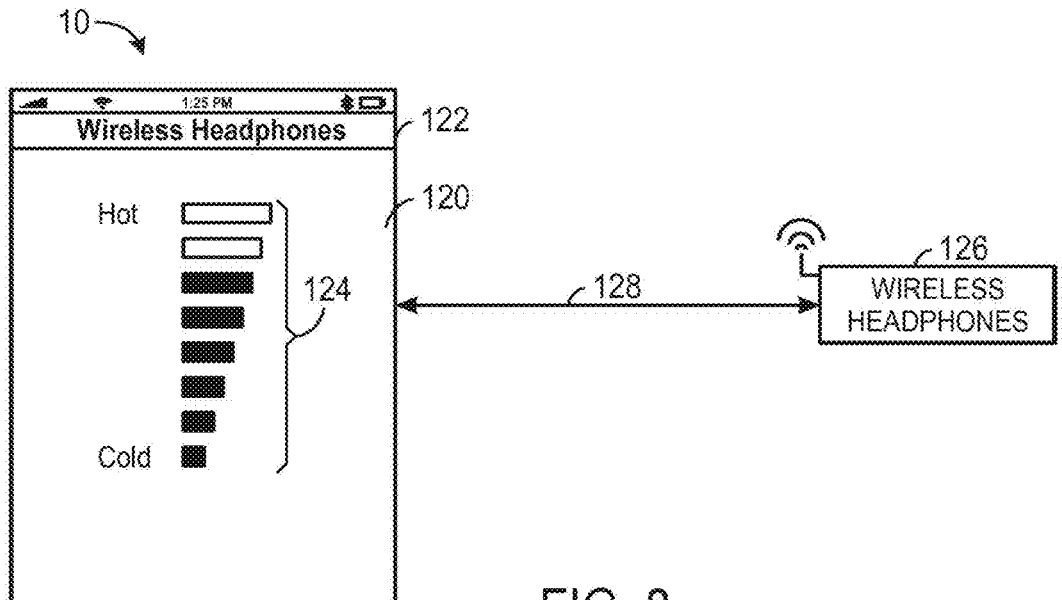
FIG. 8 illustrates a screen of the electronic device of FIG. 1 that may provide a user of the electronic device with relative proximity of an accessory, in accordance with an embodiment.

Screens of the electronic device 10 that may be used in conjunction with the method 60 of FIG. 5 are further illustrated in FIGS. 6 through 8. For example, FIG. 6 illustrates a screen of the electronic device 10 that may be displayed when an accessory is disconnected from the electronic device 10, FIG. 7 illustrates screens of the electronic device 10 that may aid a user of the electronic device 10 in finding a lost accessory, and FIG. 8 illustrates a screen of the electronic device 10 that may provide a user of the electronic device 10 with relative proximity of an accessory.

Turning now to FIG. 6, a screen 72 is illustrated to show what may be displayed on the display 18 of the electronic device 10 when wired headphones 53 are disconnected from the electronic device 10, as shown by arrow 76. For example, the screen 72 may include a section 78 that displays media file parameters that correspond to media that is currently being played. Moreover, the section 78 may include song information 80, such as a track, an artist, and/or an album of a song currently being played. As may be appreciated, the section 78 may include any suitable media file parameters for media that is being played (e.g., a song title, an album name, an artist, a movie name, a file name, and so forth).

The screen 72 may also include a current time 82. As discussed above, the electronic device 10 may be configured to detect and store parameters associated with disconnecting the accessory. Accordingly, when the wired headphones 53 are disconnected from the electronic device 10, the electronic device 10 may detect and store parameters, such as the song information 80, the current time 82, a location, and so forth (e.g., Track-I'm out of here, Artist—Lost, Album—Detached, Time of Disconnect—2:30 PM). Such information may be stored for later recall to assist the user in remembering when and/or where the headphones 53 were disconnected from the electronic device 10.

As discussed above, the electronic device 10 may receive a request from a user for assistance in locating a lost accessory in a variety of ways. FIG. 7 illustrates screens of the electronic device 10 that may aid the user in finding the lost accessory. A screen 84 provides the user with an icon 86 configured to facilitate finding the lost accessory. After the icon 86 is selected, a screen 88 may be displayed. As illustrated, the screen 88 may provide the user with a "find accessory" menu 90. Various accessories may be provided on the screen 88 that the user may desire to find. For example, wired headphones 92, wireless headphones 94, an adaptor cable 96, a power cable 98, a keyboard 100, a docking station 102, and a speaker 104, may be available for the user to select.

As may be appreciated, the electronic device 10 may execute different instructions based on which accessory is selected. For example, certain instructions executed by the electronic device 10 may correspond to finding accessories that are not capable of providing feedback to the electronic device 10 (e.g., wired headphones, an adaptor cable, a power cable, a keyboard, a docking station, a speaker). Moreover, other instructions executed by the electronic device 10 may correspond to finding accessories that have limited capabilities of providing feedback to the electronic device 10 (e.g., Bluetooth or Wi-Fi enabled technology, such as wireless headphones). As may be appreciated, some instructions may be more suitable for finding certain accessories. For example, a song, a time, and/or a location may work best for finding headphones or speakers, while a time, a location, and/or a device identifier may work best for finding an adaptor cable, a power cable, a keyboard, or a docking station.

In the present embodiment, the wired headphones 92 may be selected. Accordingly, after selecting the wired headphones 92, a screen 106 may be displayed. As illustrated, the screen 106 may provide the user with information corresponding to the wired headphone 92 via a "wired headphones" menu 108. The information may aid the user in finding wired headphones 53, such as by jogging the user's memory with information about prior use of the wired headphones 53. For example, the information may include a date and/or a time 110 when the wired headphones 53 were connected to the electronic device 10, a location 112 where the wired headphones 53 were connected to the electronic device 10, a date and/or a time 114 when the wired headphones 53 were disconnected from the electronic device 10, a location 116 where the wired headphones 53 were disconnected from the electronic device 10, and/or media information 118 corresponding to media last played with the wired headphones 53 connected to the electronic device 10.

Moreover, in certain embodiments, the electronic device 10 may be configured to provide data corresponding to a distance between the electronic device 10 and an accessory. FIG. 8 illustrates a screen of the electronic device 10 that may provide a user of the electronic device 10 with a relative proximity of the accessory (e.g., a Bluetooth or Wi-Fi device) from the electronic device 10. For example, a screen 120 may be displayed with a "wireless headphones" menu 122. The screen 120 may provide an indication 124 that corresponds to a signal strength received from wireless headphones 126. In certain embodiments, the indication 124 on the screen 120 may be a compass or map.

The signal strength may relate to a distance 128 between the electronic device 10 and the wireless headphones 126. As illustrated, the indication 124 may indicate whether the electronic device 10 is getting more "Hot" or more "Cold" in relation to the wireless headphones 126. For example, as the electronic device 10 approaches the wireless headphones 126 an indicator, such as the illustrated bars, may show that the electronic device 10 is getting hotter. Moreover, as the electronic device 10 gets further away from the wireless headphones 126 the indicator may show that the electronic device 10 is getting colder. Thus, a user may monitor the indicator to aid in determining the location of the wireless headphones 126.

Figure 9:
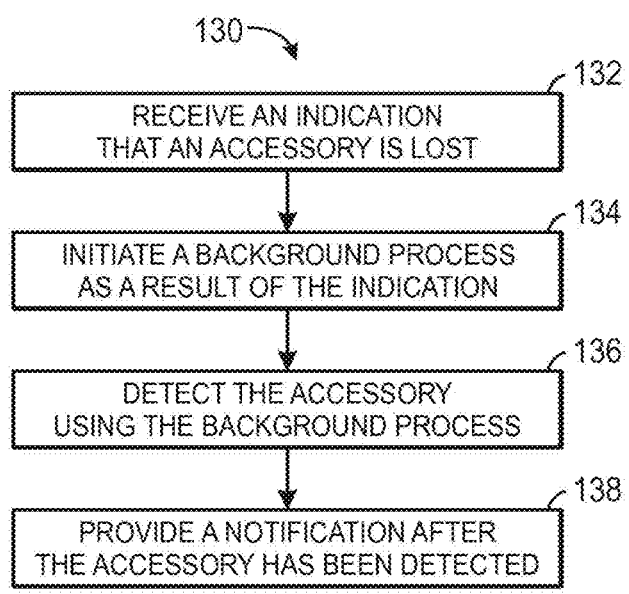
FIG. 9 is a flowchart describing a method for locating accessories of the electronic device of FIG. 1 using a background process, in accordance with an embodiment.

The electronic device 10 may include a background process for aiding a user in finding a lost accessory. Accordingly, FIG. 9 is a flowchart describing a method 130 for locating accessories of the electronic device 10 using a background process. For example, the electronic device 10 may receive an indication that an accessory is lost (block 132). The indication may be received by the user of the electronic device 10 selecting an icon (e.g., or another selection) indicating that an accessory is lost. Moreover, the electronic device 10 may receive the indication from another device.

The electronic device 10 may initiate a background process as a result of the received indication (block 134). In certain embodiments, after being initiated, the background process may operate without interfering with a user operating other applications. The background process may be configured to periodically search for the lost accessory until the lost accessory is found and/or until an indication is received to stop searching for the lost accessory. Accordingly, the user may initiate the background process and may forget that the background process was initiated (e.g., because it may not be readily presented to the user on the display 18 that the background process is operating).

The electronic device 10 may detect the lost accessory using the background process (block 136). For example, the background process may detect the lost accessory after the electronic device 10 is within a certain distance from the lost accessory. As another example, the background process may detect that a second electronic device is within a certain distance from the lost accessory, as explained in detail below. Moreover, the background process may detect that a second electronic device is connected to the lost accessory, also as explained in detail below. After the accessory has been detected, the electronic device 10 may provide a notification to the electronic device 10 to indicate that the accessory has been detected (block 138). For example, the electronic device 10 may display a message that states "Wireless Headphones Found." As may be appreciated, the time between when the background process is initiated and when the notification is provided may be long. For example, the time may be approximately one to five hours, days, weeks, months, and so forth.

Figure 10:
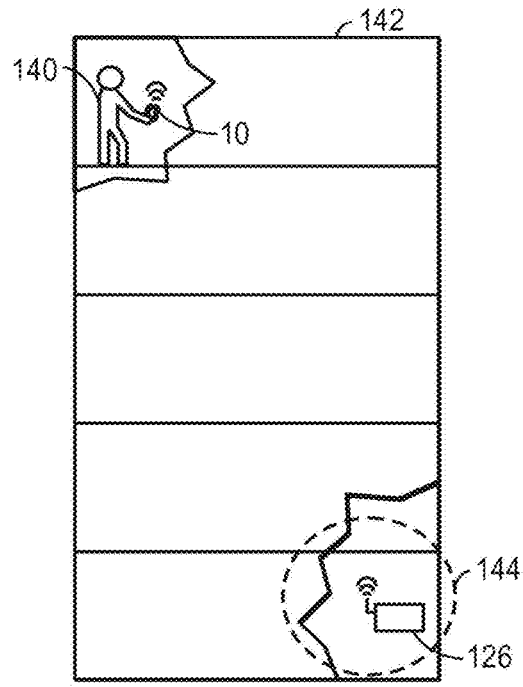
FIG. 10 is a diagram illustrating a user of the electronic device locating accessories using the method described in FIG. 9, in accordance with an embodiment.
Figure 11:
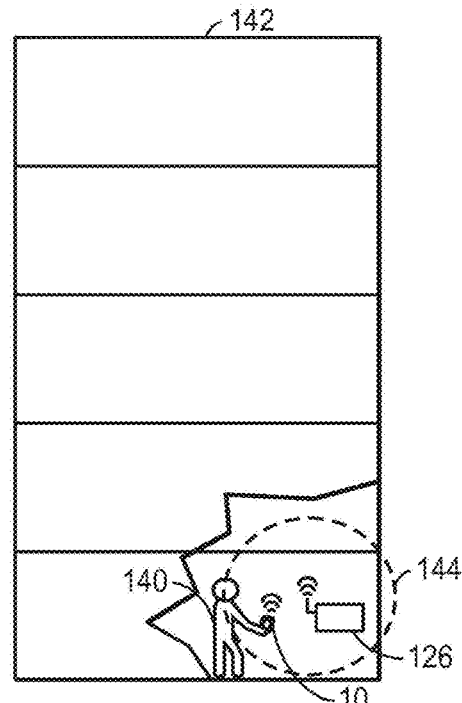
FIG. 11 is another diagram illustrating a user of the electronic device locating accessories using the method described in FIG. 9, in accordance with an embodiment.

In one embodiment, the background process may facilitate the electronic device 10 directly detecting the lost accessory. Accordingly, FIGS. 10 to 11 illustrate diagrams of a user of the electronic device 10 attempting to locate a lost accessory using the method 130 described in FIG. 9. In FIG. 10, a user 140 lost the wireless headphones 126 within a building 142. The user 140 may initiate a background process of the electronic device 10 so that the background process will operate as the user 140 performs their regular daily routine and moves throughout the building 142. Therefore, the user 140 may not be actively searching for the wireless headphones 126, yet the electronic device 10 may actively be searching for the wireless headphones 126.

As illustrated, the wireless headphones 126 have a transmission range 144. As such, the electronic device 10 may detect the wireless headphones 126 if the electronic device 10 is within the transmission range 144. In FIG. 11, the user 140 and the electronic device 10 enter within the transmission range 144. After the electronic device 10 enters the transmission range 144, the background process of the electronic device 10 may detect the wireless headphones 126 and provide a notification to the user 140 that the wireless headphones 126 have been found (e.g., that the wireless headphones 126 are within a certain distance from the electronic device 10). In certain embodiments, such as embodiments in which the electronic device 10 stores data corresponding to where an accessory was last disconnected or used, the background process may be configured to provide notification to the user 140 when the electronic device 10 is located near the GPS location stored by the electronic device 10 for the accessory. For example, the user 140 may inadvertently disconnect and leave their headphones 53 at a friend's house. The background process may remind the user 140 to look for the headphones 53 when the electronic device 10 detects (e.g., using GPS) that the electronic device 10 is located near the friend's house. Accordingly, the background process may aid the user 140 in finding the wireless headphones 126.

Figure 12:
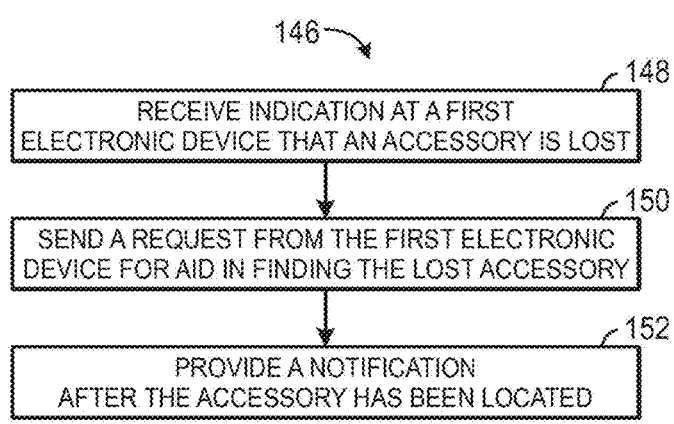
FIG. 12 is a flowchart describing a method for locating accessories of the electronic device of FIG. 1 using a second electronic device, in accordance with an embodiment.

As discussed above, the electronic device 10 may use other electronic devices to aid the electronic device 10 in finding a lost or misplaced accessory. As such, FIG. 12 is a flowchart describing a method 146 for locating accessories of the electronic device 10 using a second electronic device. Moreover, the electronic device 10 (e.g., first electronic device) may receive an indication that an accessory is lost (block 148). The indication may be received by the user 140 of the electronic device 10 selecting an icon indicating that an accessory is lost, or via any suitable means. Moreover, the electronic device 10 may receive the indication from another device. The electronic device 10 may send a request for a second electronic device (e.g., either directly or indirectly) to aid the electronic device 10 in finding the lost accessory (block 150). For example, the second electronic device may aid the electronic device 10 by determining whether the lost accessory is connected to the second electronic device as discussed in FIG. 13 and/or by determining whether the lost accessory is within a certain distance from the second electronic device as discussed in FIG. 14. After the accessory has been located, the electronic device 10 may provide a notification to the user 140 that the accessory has been found (block 152).

Figure 13:
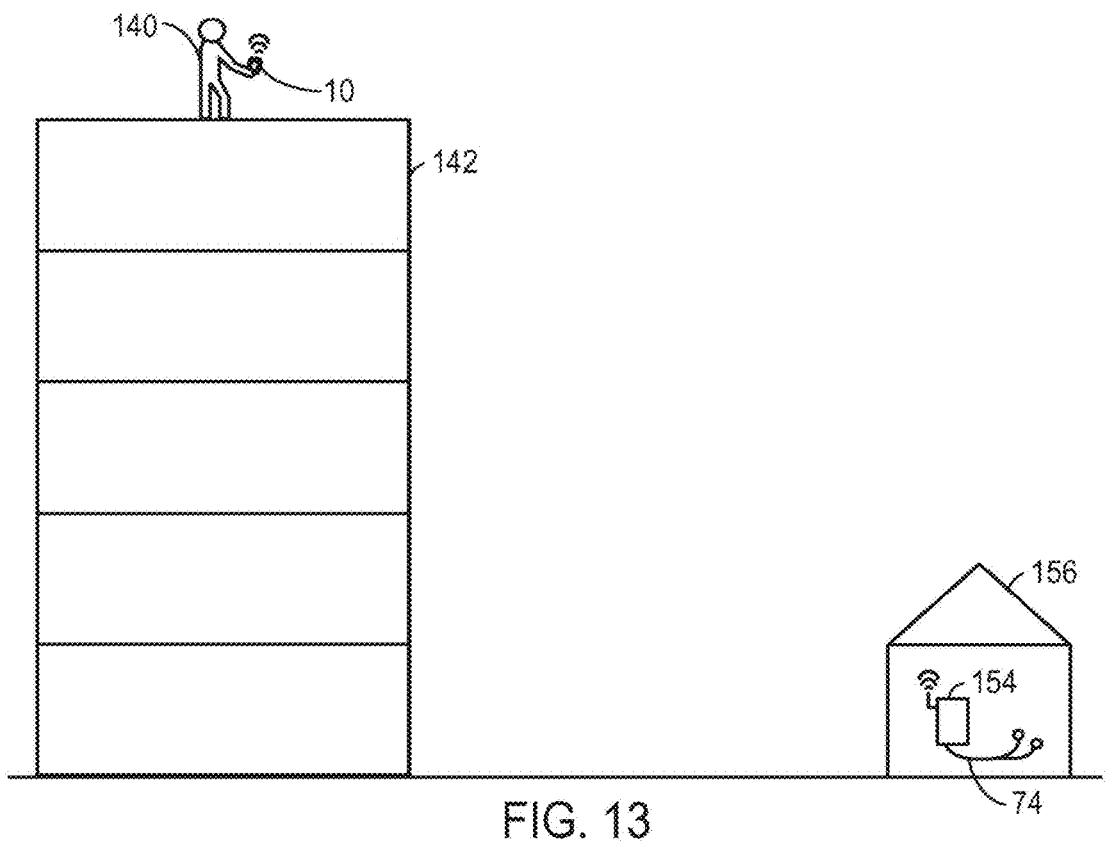
FIG. 13 is a diagram illustrating a user of the electronic device locating accessories using the method described in FIG. 12, in accordance with an embodiment.

The second electronic device may aid the electronic device 10 by determining whether the lost accessory is connected to the second electronic device. FIG. 13 is a diagram illustrating the user 140 of the electronic device 10 locating accessories with the aid of the second electronic device. Accordingly, the user 140 may be located at the building 142 and may be attempting to find the wired headphones 53. After receiving an indication that the wired headphones 53 are lost, the electronic device 10 may send a request to another electronic device 154 to aid the electronic device 10 in finding the wired headphones 53. In certain embodiments, the electronic device 154 may be physically located at the user's home 156; however, the electronic device 154 may be physically located in any suitable location.

Moreover, in some embodiments, the electronic device 10 and the electronic device 154 may be commonly owned by (e.g., and registered to) the user 140. In other embodiments, the electronic device 154 may be associated with the electronic device 10 by some link other than a link between devices commonly owned by the user 140. For example, the electronic devices 10 and 154 may be linked together using a linking software that facilitates linking devices together for finding lost accessories. As another example, the electronic devices 10 and 154 may be linked together via a virtual relationship (e.g., the user 140 may add devices owned by known individuals to a "friend network" if the known individuals authorize such a link). In certain embodiments, the electronic device 10 and the electronic device 154 may be linked using iCloud.

After receiving the request to aid the electronic device 10, the electronic device 154 may detect accessories attached to the electronic device 154 and may determine whether the detected accessories correspond to the lost accessory. For example, the electronic device 154 may detect that the wired headphones 53 are attached to the electronic device 154. Accordingly, the electronic device 154 may provide a notification to the electronic device 10 that the wired headphones 53 are attached to the electronic device 154. As may be appreciated, certain accessories may include a unique identifier (e.g., serial number, part number, MAC address, etc.). The electronic device 154 may provide the unique identifier to the electronic device 10 to aid the electronic device 10 in determining whether the appropriate accessory was detected by the electronic device 154. Moreover, the electronic device 10 may also provide a unique identifier to the electronic device 154 for the electronic device 154 to aid the electronic device 10 in finding the correct accessory. As such, the electronic device 154 may aid the electronic device 10 in finding the lost accessory.

Figure 14:
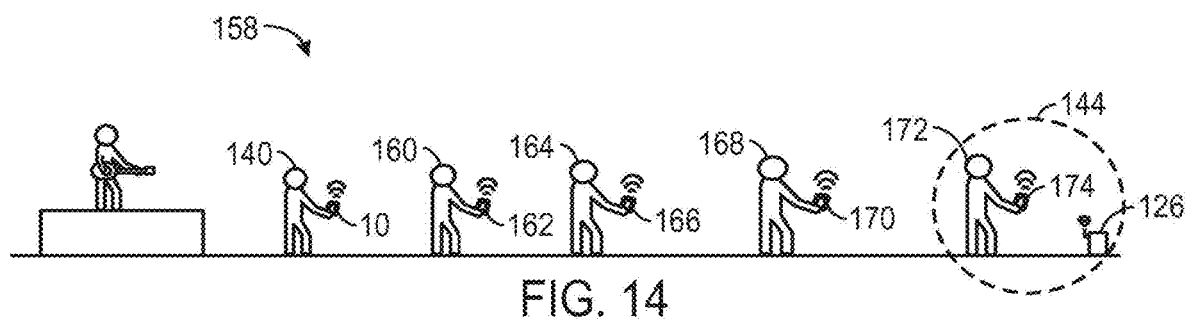
FIG. 14 is another diagram illustrating a user of the electronic device locating accessories using the method described in FIG. 12, in accordance with an embodiment.

As discussed above, a second electronic device may aid the electronic device 10 by determining whether a lost accessory is within a certain distance from the second electronic device. Accordingly, FIG. 14 is a diagram illustrating such a scenario. For example, the user 140 may be attending an event 158, such as a concert, where many other people are also attending. The user 140 may lose an accessory of their electronic device 10, such as the wireless headphones 126. Moreover, the user 140 may provide an indication to the electronic device 10 indicating that the wireless headphones 126 are lost. Thereafter, the electronic device 10 may provide a request to one or more electronic devices to aid the electronic device 10 in finding the wireless headphones 126. For example, users 160, 164, 168, and 172 may be at the event 158 and may have respective electronic devices 162, 166, 170, and 174. The electronic device 10 may provide the request for aid to one or more of the electronic devices 162, 166, 170, and 174.

In certain embodiments, the electronic device 10 may only provide the request for aid to electronic devices 162, 166, 170, and 174 that have a virtual relationship with the electronic device 10 (e.g., the electronic devices 162, 166, 170, and 174 that are owned by a friend or a known individual). In other embodiments, the electronic device 10 may provide the request for aid to all of the electronic devices 162, 166, 170, and 174. In such an embodiment, each of the electronic devices 162, 166, 170, and 174 may determine whether they will help in finding the wireless headphone 126. For example, the electronic devices 162, 166, 170, and 174 may enable a user to globally allow the electronic devices 162, 166, 170, and 174 to assist in finding lost accessories. As another example, the electronic devices 162, 166, 170, and 174 may enable a user to selectively allow the electronic devices 162, 166, 170, and 174 to assist in finding lost accessories.

In the present embodiment, if any of the electronic devices 162, 166, and 170 receives a request for aid from the electronic device 10, the electronic devices 162, 166, and 170 may not detect the wireless headphones 126 unless they enter within the transmission range 144 of the wireless headphones 126. Conversely, if the electronic device 174 receives the request for aid from the electronic device 10, the electronic device 174 may detect a distance between the wireless headphones 126 and the electronic device 174 while the electronic device 174 is within the transmission range 144 of the wireless headphones 126. Accordingly, the electronic device 174 may provide the electronic device 10 with information so that the electronic device 10 may notify the user 140 with information about the location of the wireless headphones 126. Thus, a second electronic device may aid the electronic device 10 in finding the lost accessory.

Figure 15:
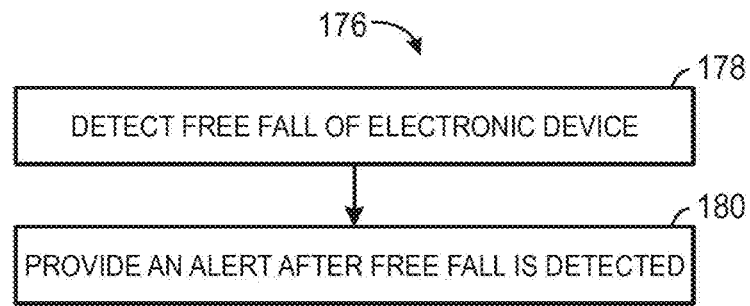
FIG. 15 is a flowchart describing a method for providing feedback to a user of the electronic device of FIG. 1 when the electronic device falls, in accordance with an embodiment.

The electronic device 10 may be configured to provide an alert to an accessory before the electronic device 10 itself becomes lost, such as when the electronic device 10 enters a free fall condition. Accordingly, FIG. 15 is a flowchart describing a method 176 for providing feedback to the user 140 of the electronic device 10 when the electronic device 10 falls. For example, the electronic device 10 may be configured to detect free fall of the electronic device 10 (block 178). The electronic device 10 may detect its own free fall using an accelerometer, a gyroscope, or any other suitable sensing device. After detecting its own free fall, the electronic device 10 may provide an alert (block 180). In certain embodiments, the electronic device 10 may provide an audible alert. In other embodiments, the electronic device 10 may provide an alert to an accessory, such as an audible alert to the wireless headphones 126. The audible alert may facilitate helping the user 140 to not lose the electronic device 10.

Figure 16:
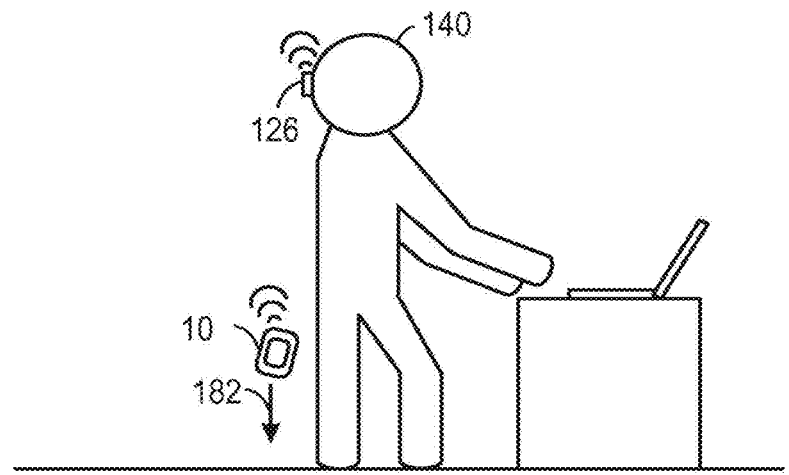
FIG. 16 is a diagram illustrating a user of the electronic device receiving feedback using the method described in FIG. 15, in accordance with an embodiment.

Turning to FIG. 16, the user 140 of the electronic device 10 is illustrated. In this embodiment, the user 140 drops the electronic device 10 and the electronic device 10 enters free fall, as illustrated by arrow 182. After the electronic device 10 detects that it has entered free fall, the electronic device 10 may provide an audible alert to the user 140 using the wireless headphones 126 to alert the user 140 that the electronic device 10 is falling. Accordingly, the user 140 may be able to retrieve the electronic device 10 so that it does not become lost.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A non-transitory machine-readable medium storing instructions which, when executed, cause one or more processors of a first electronic device to perform operations comprising:
   receiving an authorization request to aid in identifying location of an accessory device associated with a second electronic device;
   in response to the authorization request, selecting to aid, by the first electronic device, in identifying location of the accessory device associated with the second electronic device;
   receiving a wireless signal from the accessory device associated with the second electronic device;
   determining location information associated with the first electronic device using a location determination system of the first electronic device; and
   providing the location information to the second electronic device.

2. The non-transitory machine-readable medium of claim 1, the operations further comprising:
presenting, within a user interface, an indicator of a relative proximity of the first electronic device to the accessory device.

3. The non-transitory machine-readable medium of claim 2, the operations further comprising:
presenting, within the user interface, a map with the location of the accessory device.

4. The non-transitory machine-readable medium of claim 1, the operations further comprising:
receiving a wireless signal at the first electronic device from the accessory device.

5. The non-transitory machine-readable medium of claim 1, the operations further comprising:
detecting a disconnection from the accessory device; and storing a last known location for the accessory device.

6. The non-transitory machine-readable medium of claim 1, the operations further comprising:
receiving an indication of a connection between the second electronic device and the accessory device.

7. The non-transitory machine-readable medium of claim 1, wherein the first electronic device and the second electronic device are part of a network of devices authorized to locate the accessory device.

8. The non-transitory machine-readable medium of claim 1, wherein the location determination system includes a satellite-based positioning system.

9. The non-transitory machine-readable medium of claim 1, wherein determining the location of the accessory device includes:
determining the location of the second electronic device via a location determination system of the second electronic device;
determining a distance between the accessory device and the second electronic device based on one or more characteristics of the wireless signal received by the second electronic device; and
transmitting the location of the accessory device.

10. The non-transitory machine-readable medium of claim 9, wherein the one or more characteristics of the wireless signal received by the second electronic device include a signal strength of the wireless signal.

11. The non-transitory machine-readable medium of claim 9, wherein the wireless signal from the accessory device includes an identifier.

12. A non-transitory machine-readable medium storing instructions which, when executed, cause one or more processors of a first electronic device to perform operations comprising:
receiving an authorization request to form a relationship with other devices to aid in identifying location of an accessory device associated with a second electronic device;
in response to the authorization request, selecting, by the first electronic device, to form the relationship with other devices to aid in identifying location of an accessory device associated with a second electronic device;
receiving, at the first electronic device, a location of the accessory device, the location of the accessory device determined based on the location of the second electronic device and a wireless signal received from the accessory device by the second electronic device; and
presenting, within a user interface on the first electronic device, information on a distance between the first device and the accessory device using the received location of the accessory device.

13. The non-transitory machine-readable medium of claim 12, the operations further comprising:
presenting, within the user interface, an indicator of a relative proximity of the first electronic device to the accessory device.

14. The non-transitory machine-readable medium of claim 12, the operations further comprising:
presenting, within the user interface, a map with the location of the accessory device.

15. The non-transitory machine-readable medium of claim 12, wherein the first electronic device and the second electronic device are part of a network of devices authorized to locate the accessory device.

16. The non-transitory machine-readable medium of claim 12, the operations further comprising:
receiving a wireless signal at the first electronic device from the accessory device.

17. The non-transitory machine-readable medium of claim 12, the operations further comprising:
detecting a disconnection from the accessory device; and storing a last known location for the accessory device.

18. The non-transitory machine-readable medium of claim 12, the operations further comprising:
receiving an indication of a connection between the second electronic device and the accessory device.

19. The non-transitory machine-readable medium of claim 12, wherein determining the location of the accessory electronic device includes:
determining the location of the second electronic device via a location determination system of the second electronic device;
determining a distance between the accessory device and the second electronic device based on one or more characteristics of the wireless signal received by the second electronic device; and
transmitting the location of the accessory device.

20. The non-transitory machine-readable medium of claim 19, wherein the location determination system includes a satellite-based positioning system.

21. The non-transitory machine-readable medium of claim 19, wherein the one or more characteristics of the wireless signal received by the second electronic device include a signal strength of the wireless signal.

22. The non-transitory machine-readable medium of claim 19, wherein the wireless signal from the accessory device includes an identifier.

23. A computer-implemented method comprising:
receiving an authorization request to aid in identifying location of an accessory device associated with a second electronic device;
in response to the authorization request, selecting to aid, by a first electronic device, in identifying location of the accessory device associated with the second electronic device;
receiving a wireless signal from the accessory device associated with the second electronic device;
determining location information associated with the first electronic device using a location determination system of the first electronic device; and
providing the location information to the second electronic device.

24. The computer-implemented method of claim 23, further comprising:
presenting, within a user interface, an indicator of a relative proximity of the first electronic device to the accessory device.

* * * * *